(12) United States Patent
Boshy et al.

(10) Patent No.: US 9,324,028 B1
(45) Date of Patent: Apr. 26, 2016

(54) COLLABORATIVE FILTERING OF CONTENT RECOMMENDATIONS

(71) Applicant: Outbrain Inc., New York, NY (US)

(72) Inventors: Shlomy Boshy, Nes Ziona (IL); Yaron Galai, New York, NY (US)

(73) Assignee: Outbrain Inc., New York, NY (US)

( * ) Notice: Subject to any disclaimer, the term of this patent is extended or adjusted under 35 U.S.C. 154(b) by 181 days.

(21) Appl. No.: 14/193,900

(22) Filed: Feb. 28, 2014

(51) Int. Cl.
G06Q 30/00 (2012.01)
G06N 5/04 (2006.01)
G06N 99/00 (2010.01)

(52) U.S. Cl.
CPC .............. *G06N 5/04* (2013.01); *G06N 99/005* (2013.01)

(58) Field of Classification Search
None
See application file for complete search history.

(56) References Cited

U.S. PATENT DOCUMENTS

2010/0251305 A1* 9/2010 Kimble .............. H04N 7/17318
  725/46
2013/0254217 A1* 9/2013 Xu ..................... G06F 17/30867
  707/754

* cited by examiner

*Primary Examiner* — Kakali Chaki
*Assistant Examiner* — Michael Zidanic
(74) *Attorney, Agent, or Firm* — Lowenstein Sandler LLP (57) ABSTRACT

Identifying collaboratively filtered content recommendations based on user activity data collected from users in an electronic environment is disclosed. The user activity data includes information relating to user-engagement indications of the users. Multiple connection pairs are identified based on the user activity data, with each connection pair including a potential target document and a candidate recommendation document. A connection strength is determined for each of the identified connection pairs. An overall grade is generated for a set of candidate connection pairs of the plurality of connection pairs, wherein the overall grade is based on the respective connection strength associated with each of the set of candidate connection pairs. One or more filtered recommendations for provisioning in connection with the target document based on a comparison of the overall grade associated with each of the set of candidate connection pairs.

17 Claims, 6 Drawing Sheets

COLLABORATIVE FILTERING OF CONTENT RECOMMENDATIONS

TECHNICAL FIELD

The present disclosure relates to content recommendations and, more particularly, to a technique of providing content recommendations to users.

BACKGROUND

In the electronic content publishing industry, it is desirable for a content publisher (e.g., a website provider) to present its users not only with interesting, relevant and engaging content in an initial form (e.g., a webpage), but also provide users of the publisher's content with additional recommended content. In the rapidly changing electronic content landscape, the publisher seeks ways to filter the massive pool of possible content recommendations in order to identify a recommendation that is likely to be of interest to the user. Advantageously, optimized filtering of the possible content increases the user's consumption of the recommended content, achieving a higher level of user engagement and strengthening the user's relationship with the publisher, while increasing the content publisher's revenue.

BRIEF DESCRIPTION OF THE DRAWINGS

The present disclosure will be understood more fully from the detailed description given below and from the accompanying drawings of various implementations of the disclosure.

DETAILED DESCRIPTION

A system and method for collaboratively filtering candidate content recommendations to identify filtered content recommendations for provisioning to a user is described, according to various implementations. Content providers publishing content via a document (also referred to as a "target document") may wish to provide a content recommendation to a user. In an embodiment, the content provider may have one or more content recommendation opportunities via which the recommendations may be presented in connection with the original content of the target document. A content recommendation or recommendation hereinafter refers to a representation of digital content. A recommendation can include one or more text, links, thumbnails, images, icons, videos, documents, files, etc. A document hereinafter refers to any electronic presentation of content, including, for example, a webpage, a mobile application graphical user interface (GUI), etc.

For example, a content provider, such as a news web site, may wish to provide a user visiting a web page of the web site (e.g., Document X) with one or more recommendations related to Document X (i.e., the target document). The content provider (e.g., the news web site publisher) may use a third party recommendation service provider to generate one or more content recommendations that are filtered and selected for provisioning in connection with the target document (i.e., Document X). In this regard, when a user visits a target document published by a content publisher, a filtered content recommendation may be generated and provisioned in connection with the target document.

The present disclosure describes efficient and optimal techniques for effectively scaling and processing collaborative filtering for large datasets of users, publisher content and content recommendations prone to quick aging and loss of user interest (e.g. news articles). In an implementation, a collaboratively filtered content recommendation is generated and provided with the target document. As used herein, the term "collaboratively filtered content recommendation" includes, but is not limited to, a content recommendation that is generated in accordance with the implementations described below in detail. The collaboratively filtered content recommendation is based on identifying document connection pairs associated with the target document based on a collection of user activity data. The user activity collected from multiple users represents a collaboratively generated data set regarding multiple users' activity and may be used to identify the underlying relationships or connections between the documents visited by those users.

In an implementation, a document connection pair represents a candidate recommendation document which is determined to have a connection or relationship with the target document. A candidate recommendation document and a target document are determined to have a connection if it is determined that one or more users who provided a user-engagement indication with respect to the target document also provided a user-engagement indication with respect to the candidate recommendation document. According to implementations, the user-engagement indication may be collectively referred to as an indication that a user "liked" a particular document.

According to implementations, a user-engagement indication may include any user activity data relating to a user's electronic or web-based content consumption history. The user activity data may include any implicit or explicit data associated with a user's electronic actions or activity including, but not limited to, document visits, clicks on a widget or application, scrolling of document sections, pointing device (e.g., mouse or keyboard) movements, clicks or other indications, a time of activity relating to a document (e.g., a webpage and/or web site), a listing of web sites visited by a user, languages a user reads, viewing a document link (e.g., a recommendation) but not interacting with the link (e.g., time spent hovering over the link), special interest indicators such as "thumbs up" indications or "thumbs down" indications, user explicit data such as categories, etc.

In an example, a document connection pair including Document X and Document Y may be identified based on user-engagement indications collected from multiple users which indicate that those users who "liked" Document X, also provided an indication that they "liked" Document Y within a selected time period (e.g., ten minutes, one hour, one day, etc.).

According to implementations, having identified document connection pairs for a target document, a strength of the document connection pairs is determined. In an implementation, the strength of each document connection pair may be based in part on a quantity of unique users who "connected" the documents (i.e., the number of unique users that "liked" both documents in the pair within the selected time period).

According to implementations, with respect to a target document, the set of identified document connection pairs (each including the target document and a candidate recommendation document) are graded in order to identify one or more filtered document recommendations. In implementations, the grade determined for each document connection pair may be based on one or more of a common user component, an aging component, or a causality component (each of which are described in detail below).

In an implementation, the common user component of the grade represents an expression of the document connection pair strength. The common user component is a measure of a quantity of unique users that "liked" both documents of the document connection pair.

In an implementation, the aging component of the grade represents a measure of one or more of an age of the candidate recommendation document (e.g., Document Y in the example above) within a given document connection pair and/or an age of the document connection pair. Since, in certain instances, content recommendations age relatively fast, the connection between two documents may age quickly as well. In an implementation, the aging component of the overall grade takes into account (e.g., by a negative or decreasing component) the age of the connection between the target document and the candidate recommendation document and/or the age of the candidate recommendation document (e.g., a measurement of the time that has elapsed since the candidate recommendation document was initially published). In an implementation, an aging rate may be identified for application to a document connection pair and/or a candidate document. The aging rate may be selected based on a category of the content and/or documents in the document connection pair. For example, content/documents in a "news" category may have a higher aging rate than content/documents in a "science" category (i.e., news content ages faster than science content).

Advantageously, the aging component reduces the bias associated with document connection pairs which have a high common user grade component as a result of being tracked by the system for a long time. In an implementation, the aging component provides a reduction to the overall grade for document connection pairs that are "old" and have a high common user grade which does not accurately reflect a current strength of the document connection pair.

According to implementations, the overall grade for a candidate recommendation may be based on a causality component. The causality component is a negative or decreasing component configured to account for and avoid assignment of an overly high or inflated grade to those documents which are visited most often (e.g., popular web sites having a high common user grade component). The documents which are generally or "globally" visited the most by users on a network (e.g., referred to as a respective document's "global user-engagement indication measure"), will also show up in a high number of document connection pairs. However, the causality component is configured to filter the document recommendations to serve recommendations "liked" by users who "liked" the target document, but not "liked" by other users. The causality component represents a decreasing function based on a measurement of a "global" quantity of users who "liked" the document (i.e., the document's global user-engagement indication measure). For example, if a document (e.g., Document Yn) is globally popular and visited by a high number of users, the causality component may account for the document's global popularity by decreasing the overall grade (since a real causality between the document Yn and the target document is desired).

According to implementations, one or more collaboratively filtered content recommendations are identified based on the overall grade determined for the respective candidate documents in the document connection pairs associated with the target document. According to implementations, the collaboratively filtered document content recommendation(s) may be provided to a user as either an organic recommendation or as a paid recommendation and may be delivered in any suitable framework, such as, for example, within or in connection with the target document (e.g., via a recommendation opportunity on a webpage), via a website widget, etc.

Figure 1:
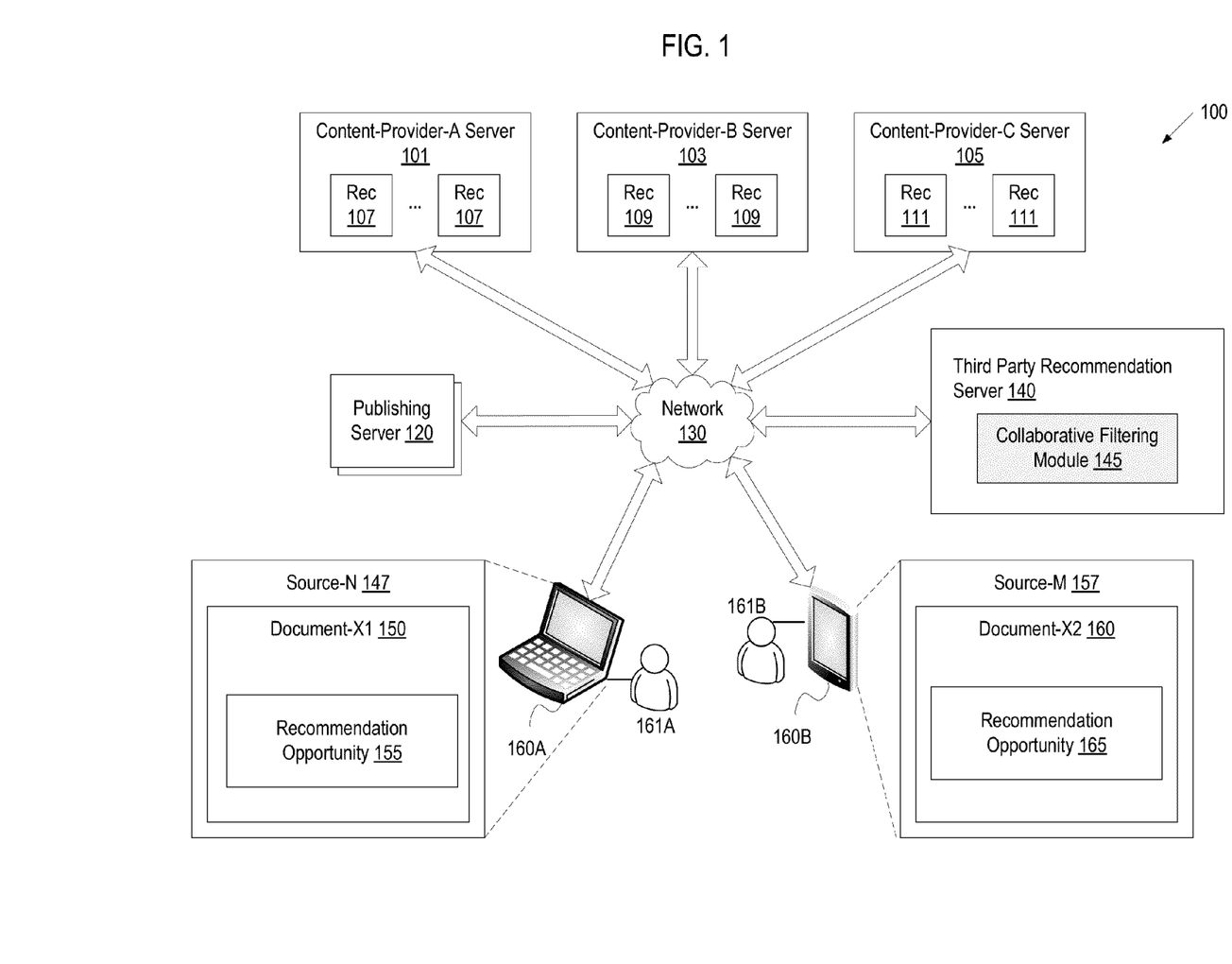
FIG. 1 illustrates an example system architecture in which examples of the present disclosure can be implemented.

FIG. 1 illustrates an example system architecture 100 in which examples of the present disclosure can be implemented. The system architecture 100 can include one or more user devices 160A-B, one or more content provider servers 101,103,105, one or more destination servers (e.g., publishing servers 120) and one or more third party recommendation servers 140 coupled to each other over one or more networks 130.

Content providers may have recommendation opportunities they wish to have populated or served with a content recommendation. For example, a publisher's target document (e.g., Document-X1 150, Document-X2 160) may include a recommendation opportunity (e.g., recommendation opportunities 155, 165) for presenting a content recommendation from one or more of the content providers 101, 103, 105. A target document 150, 160 may be for example, and is not limited to, a website homepage, section front, web page, mobile application user interface (UI), gaming application UI, television application UI, etc.

For example, a content provider 101, 103, 105 may have multiple candidate recommendations 107, 109, 111 that the content provider makes available for provisioning in connection with the target document (e.g., Document X1, Document X2) associated with a source 147, 157. A candidate content recommendation 107,109,111 can be a representation of digital content. Digital content can include, for example, such as, and not limited to, an article, a web blog entry, a social media posting, a data feed, an advertisement, a document (e.g., webpage), digital video, digital movies, digital photos, digital music, social media updates, electronic books (ebooks), electronic magazines, digital newspapers, digital audio books, electronic journals, electronic comic books, software applications, etc. Each content provider can have multiple candidate recommendations 107,109,111 considered by a collaborative filtering module 145 of a third party recommendation server 140 as a candidate for provisioning in connection with the target document.

A content recommendation host or "publisher" 101, 103, 105 hereinafter refers to an entity and/or platform hosting candidate documents (e.g., webpages, mobile application graphical user interfaces (GUIs), gaming application GUIs, television application GUIs, etc.) 107,109,111. For example, SportsNews, Inc. and BaseballNews, Inc. may be publishers. The publisher platforms can include publishing servers 120. The publisher servers 120 can be application servers that provide one or more applications (e.g., web application, mobile application, desktop application, gaming console applications, television console application, etc.). The publishing servers 120 can be coupled to one or more data stores that store publisher data and/or recommendations of content providers.

According to implementations, the target documents 150, 160 can be rendered with the collaboratively filtered recommendations generated by the collaborative filtering module 145 of the third party recommendation server 140. In implementations, the target document 150, 160 may be rendered with the one or more collaboratively filtered recommendations on user devices 160A-B using for example, an application (e.g., web browser, mobile application, desktop application, gaming application, television application, etc.).

A target document 150,160 can be within a source 147,157. The source 147,157 may include, but is not limited to, a publisher's website, a publisher's mobile application, publisher's gaming application, publisher's television application, etc. For example, the SportsNews website (e.g., source 147) can include a webpage (e.g., target document 150) that contains an article about a baseball game (e.g., publisher content) and one or more recommendation opportunities 155. The one or more recommendation opportunities 155,165 may be populated with one or more collaboratively filtered recommendations selected from a pool or set of candidate recommendations 107,109,111.

In an implementation, the content providers may wish to publish their respective recommendations 107,109,111 in widespread locations (e.g., target document 150, target document 160). In an example, the content providers can use the service hosted by the third party recommendation service provider to have the recommendations 107,109,111 of the content providers served to populate the recommendation opportunities 155,165 in the target documents 150,160.

The third party recommendation service provider can host one or more third party recommendation servers 140 to provide the service to the content providers and publishers. The servers 140 include the collaborative filtering module 145 configured to generate one or more collaboratively filtered content recommendations for provisioning in connection with a target document 150, 160. The collaborative filtering module 145 is a software component (e.g., a set of instructions residing in a memory) executable by one or more processing devices to perform the collaborative filtering activities described herein (e.g., the methods described in detail in connection with FIGS. 3-4). The instructions of the collaborative filtering module 145 may reside in a memory including any suitable computer readable storage medium, such as volatile memory devices (e.g., random access memory (RAM)), non-volatile memory devices (e.g., flash memory), a magnetic hard disk, a Universal Serial Bus (USB) solid state drive, a local disk, an external disk, and/or other types of memory devices).

The network of content providers can include, for example, multiple candidate recommendations 107,109,111 that may be stored in one or more data stores that are coupled to the network 130. The architecture 100 can include, for example, multiple documents 150,160 that are accessed by multiple users 161A-B on various user devices 160A-B.

For example, a target document 150 may have a recommendation opportunity 155 for provisioning a collaboratively filtered content recommendation. When a user 161A accesses the target document 150, collaboratively filtered recommendations identified by the collaborative filtering module 145 are used to generate a set of personalized content recommendations to populate the recommendation opportunity 155. As each target document 150, 160, is accessed, the third party recommendation server 140 provisions one or more collaboratively filtered recommendations associated with the particular target document, in accordance with the methodologies described in detail below.

The networks 130 can include one or more local area networks (LAN), one or more wireless networks, one or more mobile communications networks, one or more wide area networks (WAN), such as the Internet, or similar communication systems, or combinations of such. The networks 130 can include one or more networking and/or computing devices such as wired and wireless devices. In one implementation, not all servers 101,103,105,120,140, and/or user devices 160A-B are directly connected to each other. The networks 130 may be separate networks.

The servers 101,103,105,120,140 can be hosted on one or more machines. The machines can include for example, and are not limited to, any data processing device, such as a desktop computer, a laptop computer, a mainframe computer, a server computer or any other device configured to process data.

A user device 160A-B can be a computing device such as a server computer, a desktop computer, a set-top box, a gaming console, a television, a portable computing device such as, and not limited to, mobile telephones, personal digital assistants (PDAs), portable media players, netbooks, laptop computers, a tablet computer, an electronic book reader, a wearable electronic device and the like. For example, user device 160A may be a laptop computer and user device 160B may be a tablet computer or a mobile smartphone.

Figure 2:
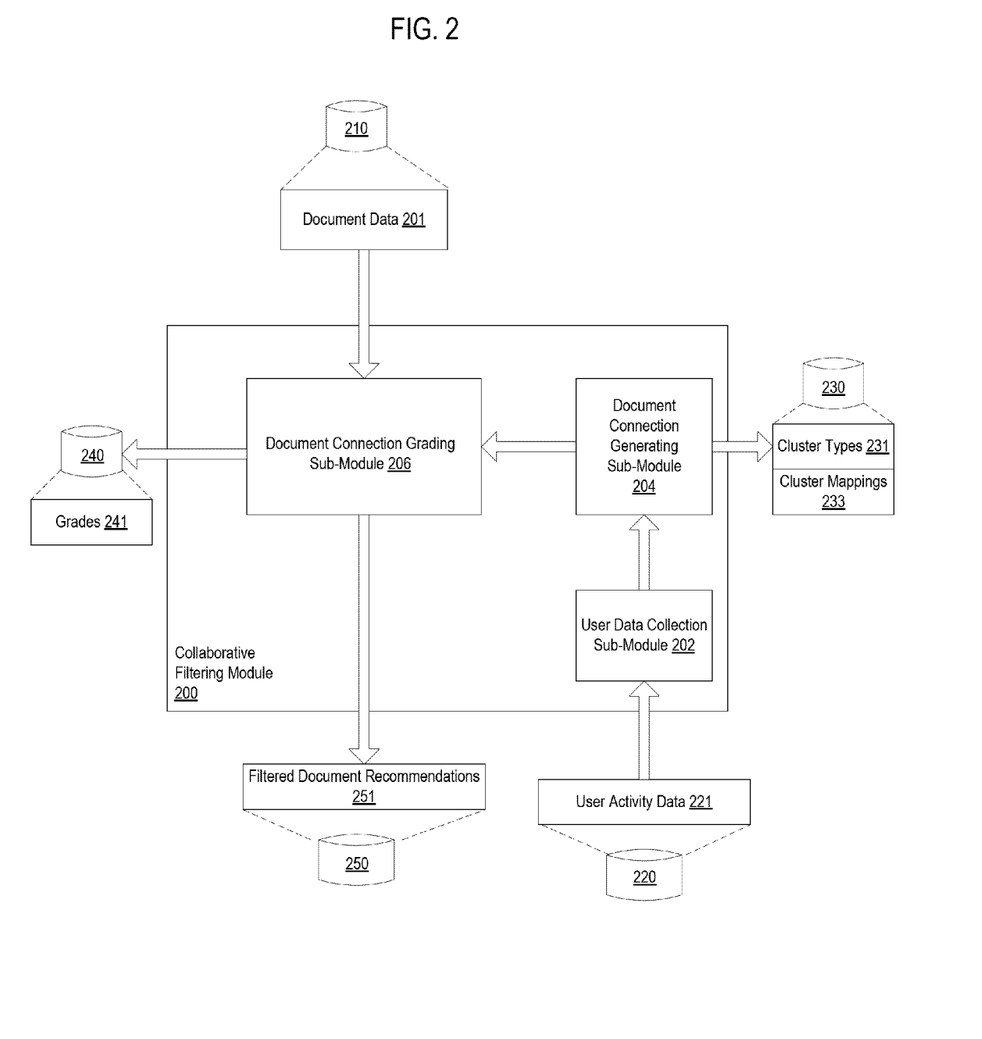
FIG. 2 is a block diagram of a collaborative filtering module, in accordance with various implementations of the present disclosure.

FIG. 2 is a block diagram of a collaborative filtering module 200 (e.g., collaborative filtering module 145 of FIG. 1), in accordance with various implementations of the present disclosure. The collaborative filtering module 200 can include a user data collection sub-module 202, a document connection generating sub-module 204, and a document connection grading sub-module 206. Note that in alternative implementations, the functionality of one or more of the user data collection sub-module 202, the document connection generating sub-module 204, and the document connection grading sub-module 206 may be combined or divided. Note that in alternative implementations, the functionality of the collaborative filtering module 200 can be separate modules.

The collaborative filtering module 200 can be coupled to one or more data stores 210, 220, 230, 240, 250 that store data. In an implementation, the data stores 210, 220, 230, 240, 250 can be persistent storage units. A persistent storage unit can be a local storage unit or a remote storage unit. Persistent storage units can be a magnetic storage unit, optical storage unit, solid-state storage unit, electronic storage units (main memory), or similar storage unit. Persistent storage units can be a monolithic device or a distributed set of devices. A 'set', as used herein, refers to any positive whole number of items.

The data stores 210, 220, 230, 240, 250 can store input and/or output data. The modules (e.g., the user data collection sub-module 202, the document connection generating sub-module 204, and the document connection grading sub-module 206) can be coupled to the one or more data stores 210, 220, 230, 240, 250 and can read from and write to the one or more data stores 210, 220, 230, 240, 250.

Data store 210 can store data relating to one or more documents (e.g., target documents and/or candidate recommendations) provided by one or more content providers. The document data 201 may include any information relating to a document, including, but not limited to, the an age of the document, a category of a document, a count identifying a "global" or general number of visits to the document (the "global user-engagement indication measure"), etc. to be considered by the collaborative filtering module 200 in grading and identifying the collaboratively filtered recommendations 251. In an implementation, the document may be a representation of digital content. According to implementations of the present disclosure, the document may include, for example, and is not limited to, one or more text, links, thumbnails, images, icons, videos, slideshows, etc.

According to implementations of the present disclosure, data store 220 is configured to store user activity data 221 collected by the user data collection sub-module 202. The user activity data may include information relating to user-engagement indications. According to implementations, a user-engagement indication may include any user activity data relating to a user's electronic or web-based content consumption history. As detailed above, the user activity data may include any implicit or explicit data associated with a user's electronic actions or activity including, but not limited to, document visits, clicks on a widget or application, scrolling of document sections, pointing device (e.g., mouse or keyboard) movements, clicks or other indications, a time of activity relating to a document (e.g., a webpage and/or web site), a listing of web sites visited by a user, languages a user reads, viewing a document link (e.g., a recommendation) but not interacting with the document link (e.g., by hovering over the link), special interest indicators such as "thumbs up" indications or "thumbs down" indications, user explicit data such as categories, etc.

The user activity data may be collected for any quantity of users via any suitable methodology. For example, user activity data from multiple users may be collected by the user data collection sub-module 202 by storing a user identifier (e.g., a cookie stored on the user's browser) and/or using a user login (e.g., wherein a user is associated with login credentials which enable the collection of user data for that user across multiple devices and browsers). According to implementations, the user activity data may be collected on a persistent and ongoing basis such that the user data collection sub-module continually captures updated information regarding the activities of the users on a network. In an implementation, the user activity data may be collected "offline" relative to the provisioning and serving of filtered content recommendations (e.g., as an ongoing backend process supplementing the collaborative filtering process).

According to implementations of the present disclosure, the document connection generating sub-module 204 is configured determine connections between target documents and candidate recommendation documents to produce document connection pairs (e.g., a pair including a target document and an associated candidate recommendation document) based on the user activity data collected by the user data collection sub-module 202. According to implementations, the document connection generating sub-module 204 may generate any suitable quantity of document connection pairs and determine a relative strength of those connection pairs, as described below in detail with regard to FIG. 3.

According to implementations of the present disclosure, the document connection grading sub-module 206 is configured to grade a set of document connection pairs identified by the document connection generating sub-module 204. In an implementation, based on the grades assigned to each of the multiple document connection pairs, the document connection grading sub-module 206 identifies one or more filtered document recommendations 251 associated with a particular target document. In an example, an overall grade for each connection pair in a set of connection pairs is determined. In an implementation, the overall grade is determined based on a common user component, an aging component and a causality component, as described in further detail in conjunction with FIGS. 4 and 5. In implementations of the present disclosure, the document connection grading sub-module 206 may determine the grades 241 for the connection pairs and store the grades 241 in the data store 240.

Figure 3:
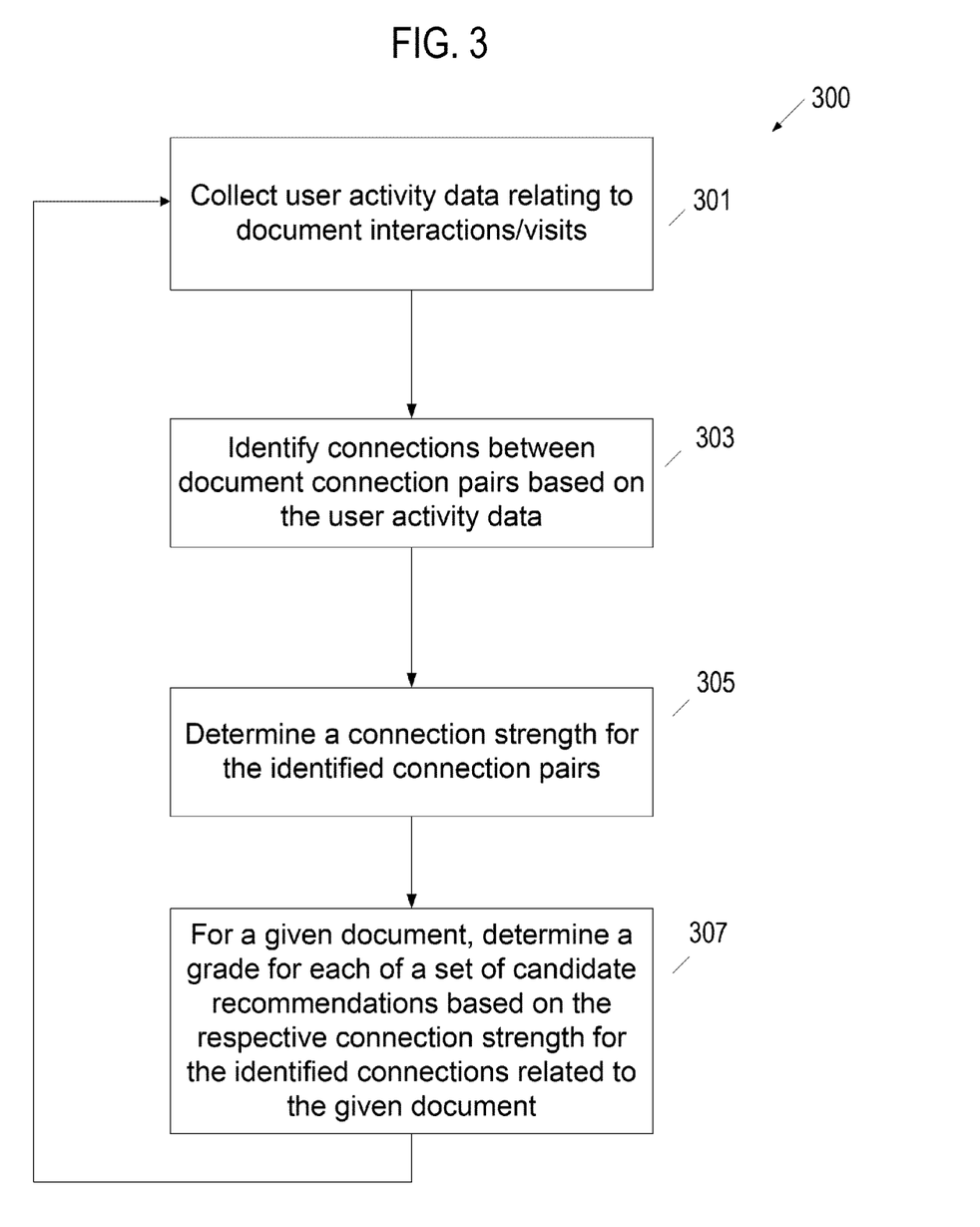
FIG. 3 is a flow diagram of an implementation of a method for determining grades for candidate recommendations.

FIG. 3 is a flow diagram of an exemplary implementation of a method 300 for generating a collaboratively filtered content recommendation for a target document (e.g., Document X). The method may be performed by processing logic that may comprise hardware (circuitry, dedicated logic, etc.), software (such as is run on a general purpose computer system or a dedicated machine), or a combination of both. In an implementation, the method 300 may be performed by the collaborative filtering module 145 hosted in a server 140 of FIG. 1 or by the collaborative filtering module 200 illustrated in FIG. 2.

At block 301, the collaborative filtering module collects user activity data from multiple users of a network. In an implementation, the user activity data may be collected for any quantity of users via any suitable methodology, including the use of user identifiers such as a cookie, user registration, scraping and/or crawling techniques, etc. In implementations, the user activity data may be collected periodically with any suitable frequency (e.g., every minute, every five minutes, every hour, every day, etc.). In implementations, the user activity data may be collected incrementally and aggregated on a per target document basis (e.g., for each potential target document on the network). According to an implementation, the user activity data may be collected using a Hadoop (e.g., map-reduce) framework for distributed, parallel and scalable data collection. In an implementation, the user activity data is used to determine the occurrence of a user engagement indication (e.g., a visit to a web page) for multiple documents on the network.

In block 303, multiple document connection pairs are identified based on the user activity data. For example, the user activity data may indicate that users who visited a first document (e.g., Document X) also visited Documents Y1, Y2, Y3 and Y4 within a certain period of time (e.g., time Z). It is noted that any period of time may be used in identifying connections (e.g., time Z may be one minute, ten minutes, 1 day, 1 week, 1 month, etc.). In view of the aforementioned user activity data, the following document pairs may be generated: (X, Y1); (X, Y2); (X, Y3), and (X, Y4). In an implementation, the identification of connections is an "offline" process which can be performed incrementally, wherein according to an established period (e.g., every hour) the data relating to new connections between documents is determined to the system.

In block 305, for each of the identified connection pairs, a connection strength is determined. In an implementation, the connection strength is a measure of a relative strength of the connection between the documents in the document pair. For example, if 100 unique users visit document X and document Y1 within 5 hours of one another and only 10 unique users visit document X and document Y2 during the same period, the (X, Y1) connection pair is considered stronger than the (X, Y2) connection pair. In an implementation, the document connection pair may be expressed as: [Time, X, Y1, number of unique connections during the Time], wherein the number of unique connections (e.g., a number of unique users who "connected" the two documents) during the established period (e.g., Time) represents the connection strength. In an example, aggregation of the user activity data and updating of the document connection pair expression provides for a more robust measurement of the relative connection strength (e.g., an ongoing measurement of the number of unique users indicating a document connection).

In block 307, for a given target document (e.g., Document X), a grade is determined for each of a set of candidate recommendations (e.g., Documents Y1, Y2, Y3, Y4, etc.). The set of candidate recommendations for which a grade is calculated is selected from the set of identified connections involving the target document. For example, in blocks 303 and 305, for target document X, if there are five hundred identified connection pairs, the set of candidate recommendations that are graded may be the entire set of identified connection pairs or a portion of the total identified connection pairs (e.g., the ten connection pairs having the highest connection strength). In an implementation, the grade for the set of candidate recommendations may be based at least in part on the respective connection strength determined in block 305, as detailed below with respect to FIG. 4.

Figure 4:
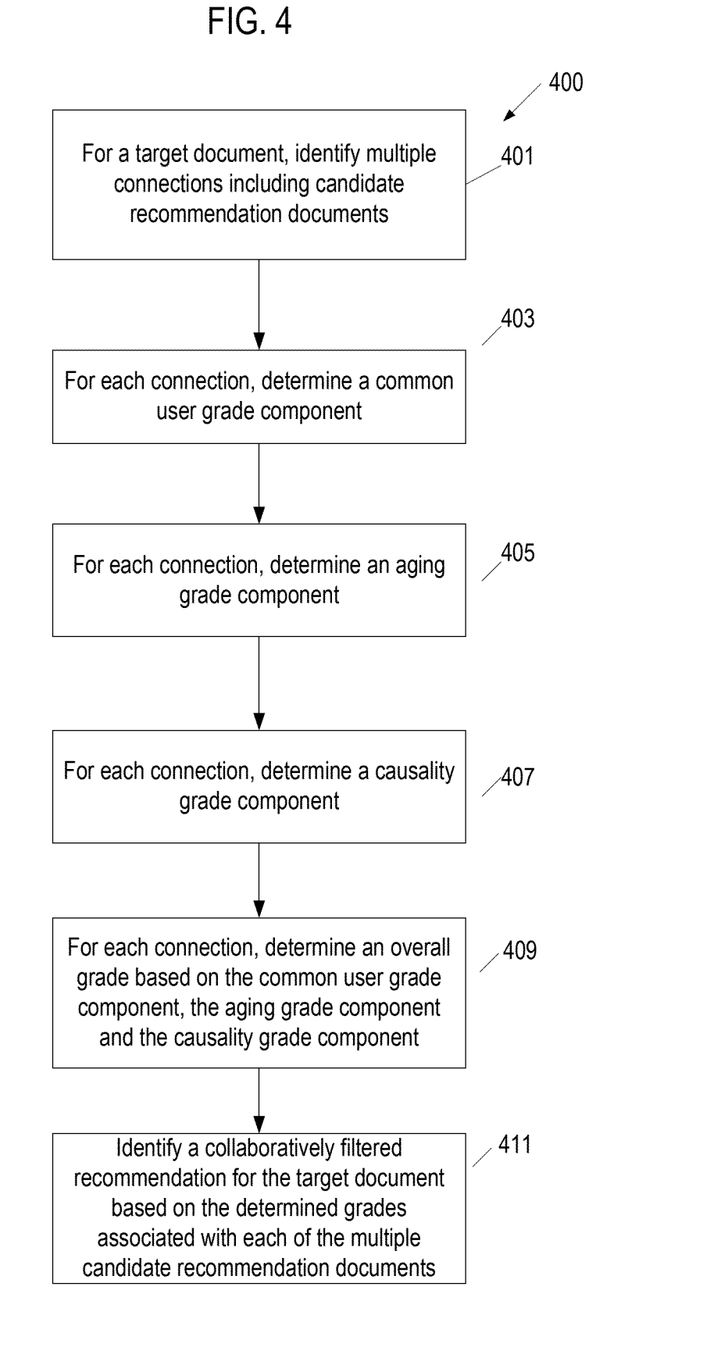
FIG. 4 is a flow diagram of an implementation of a method for generating collaboratively filtered content recommendations associated with a target document.

FIG. 4 is a flow diagram of an exemplary implementation of a method 400 for identifying a collaboratively filtered recommendation for a target document based on grades assigned to connection pairs relating to the target document (e.g., Document X). In block 401, multiple connection pairs involving the target document and respective candidate recommendations documents are identified. In the example shown in FIG. 5, based on the user activity data, the following document connection pairs are identified for target document X: (X, Y1), (X, Y2), (X, Y3), and (X, Y4); wherein documents Y1, Y2, Y3, and Y4 represent candidate recommendation documents for presenting in a recommendation opportunity associated with target document X.

In block 403, for each connection pair, a common user grade component of an overall grade is determined. In an implementation, the common user grade component the overall grade represents an expression of the document connection pair strength (e.g., the connection strength as determined in block 305 of FIG. 3). In an implementation, the common user component is a measure of a quantity of unique users that exhibited a user-engagement indication (e.g., "liked") both documents of the document connection pair within a selected time period. It is noted that any suitable time period may be selected, such as, for example, ten minutes, one hour, one day, one week, etc.

In block 405, for each connection pair, an aging grade component of the overall grade is determined. As detailed above, in an implementation, the aging component of the grade represents a measure of one or more of an age of the candidate recommendation document (e.g., Document Y in the example above) within a given document connection pair and/or an age of the document connection pair. In an implementation, the aging component decreases the overall grade by an age of the recommendation document and/or an age of the connection pair itself. For example, for a connection pair of (X, Y2), the age of the document Y2 and/or the age of the connection (X, Y2) are considered in determined the aging component. In an implementation, an aging rate may be identified for application to a document connection pair and/or a candidate document. The aging rate may be selected based on a category of the content and/or documents in the document connection pair. For example, if document Y2 is in a "news" category, the aging rate may be relatively higher than that associated with a document pair (X, Y3), wherein Y3 is in a "science" category (i.e., news content ages faster than science content).

In block 407, for each connection pair, a causality grade component of the overall grade is determined. As detailed above, in an implementation, the causality component of the grade represents a negative or decreasing component configured to account for and avoid assignment of an overly high or inflated common user grade component to those documents that are visited most frequently (e.g., front page documents of popular web sites having a high common user grade component). The documents which are globally visited the most by users on a network (i.e., documents having a high global user-engagement indication measure), may also show up in a high number of document connection pairs. However, the causality grade component is configured to filter the document recommendations to serve recommendations "liked" by users who "liked" the target document, but not "liked" by other users. The causality component represents a decreasing function based on a measurement of a "global" quantity of users who "liked" the document. For example, if a document (e.g., Document Yn) is globally popular and visited by a high number of users, the causality component may account for the document's global popularity by decreasing the overall grade (since a real causality between the document Yn and the target document is desired).

In an implementation, one or more of the grade components determined in blocks 403-407 may be normalized. In an implementation, for a respective grade component, a maximum grade may be identified for the connection pairs in the set of candidate connection pairs. A normalized grade may then be determined for each of the candidate connection pairs by dividing the respective grade by the maximum grade, thereby producing a normalized grade for each connection pair in a range of [0, 1]. In an implementation, the normalizing may be performed separately for each grade component, with a different maximum grade established for each component.

In block 409, for each connection pair, an overall grade is determined based on the common user grade component, the aging grade component and the causality grade component. In an implementation, the overall grade associated with a connection pair may be based on a normalized common user grade component, a normalized aging grade component and/or a normalized causality grade component.

In block 411, one or more collaboratively filtered recommendations for the target document are identified based on the overall grades associated with each of the respective connection pairs. In an implementation, in an online process, a recommendation opportunity associated with target document X is populated with a candidate recommendation having a highest overall grade.

Figure 5:
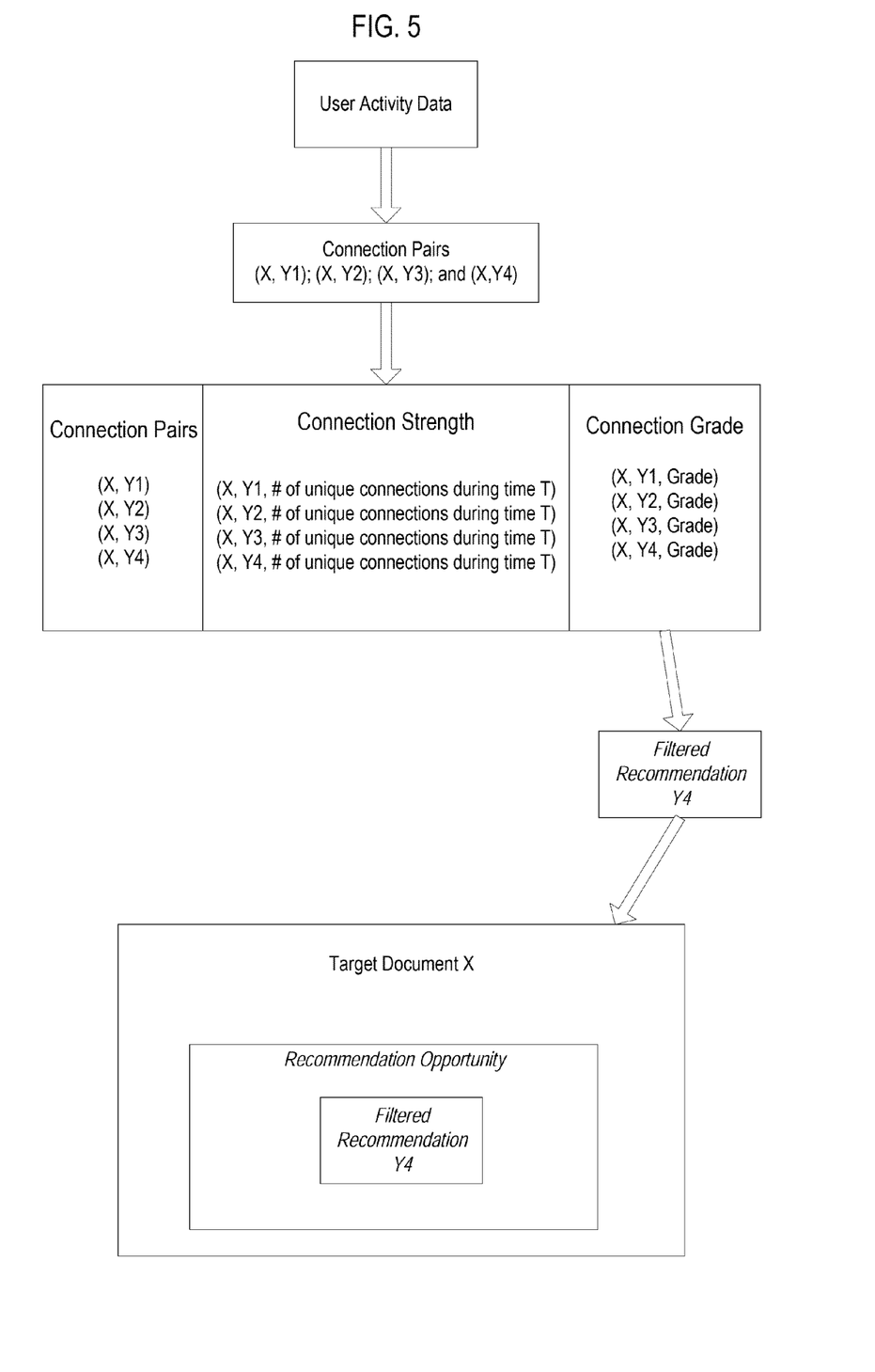
FIG. 5 illustrates an example of connection pairs and the identification of a filtered recommendation based on connection grades, according to various implementations.

In the example illustrated in FIG. 5, four connection pairs are identified for target document X (connection pairs (X, Y1), (X, Y2), (X, Y3), and (X, Y4)) based on the user activity data. For each of the connection pairs, a corresponding connection strength and overall connection grade is determined. In this example, it is assumed that the overall grade for the (X, Y4) connection is the highest, and as such, the collaboratively filtered recommendation for provisioning with the recommendation opportunity of the target document X is document Y4.

Figure 6:
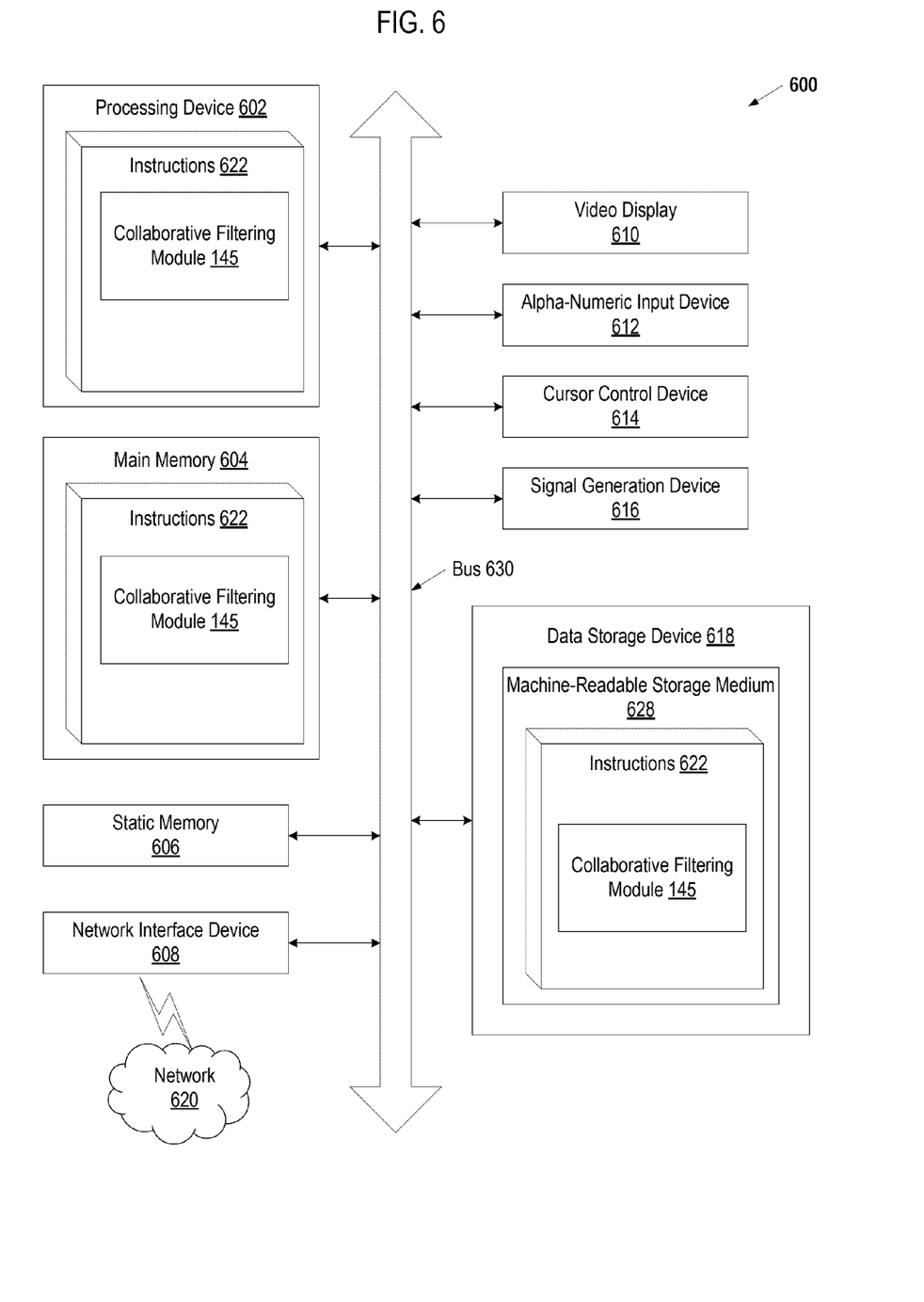
FIG. 6 is a block diagram of an example computer system that may perform one or more of the operations described herein, in accordance with various implementations.

FIG. 6 is a block diagram of an example computer system 600 that may perform one or more of the operations described herein, in accordance with various implementations In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (e.g., a processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 614, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 704. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 614 may include a computer-readable storage medium 624 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one implementation, the instructions 622 include instructions for an optimization module (e.g., collaborative filtering module 145 in FIG. 1) and/or a software library containing methods that call the optimization module. While the computer-readable storage medium 628 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting", "establishing", "generating", "identifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete and teachable fashion.

The terms "first", "second", "third", "fourth", etc. as used herein are meant as labels to distinguish among different elements and may not necessarily have an ordinal meaning according to their numerical designation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
collecting user activity data associated with a plurality of users, wherein the user activity data comprises information relating to user-engagement indications of the plurality of users;
identifying a plurality of connection pairs based on the user activity data, wherein each connection pair comprises a target document and a candidate recommendation document;
determining a connection strength for each of the plurality of connection pairs;
generating an overall grade for each of a set of candidate connection pairs of the plurality of connection pairs, wherein the overall grade is based on the respective connection strength associated with each of the set of candidate connection pairs, and wherein the overall grade is decreased in view of a causality component representing a high global user-engagement indication value for a respective candidate recommendation document; and
identifying, by a processing device, one or more filtered recommendations for the target document based on a comparison of the overall grade associated with the candidate connection pairs.

2. The method of claim 1, wherein the user-engagement indication comprises information indicating a user visited the target document and a first candidate recommendation document within a selected time period.

3. The method of claim 1, further comprising facilitating provisioning of at least one of the one or more identified filtered recommendations associated with the target document.

4. The method of claim 1, wherein the overall grade is based at least in part on a common user component, an aging component, and the causality component.

5. The method of claim 4, wherein the common user component represents a measure of unique user-engagement indications associated with a respective connection pair.

6. The method of claim 4, wherein the aging component represents a measure of an age of a respective candidate recommendation document.

7. The method of claim 4, wherein the aging component represents a measure of an age of a respective connection pair of the plurality of connection pairs.

8. A system comprising:
a memory to store instructions; and
a processing device operatively coupled with the memory, the processing device to execute the instructions to:
collect user activity data associated with a plurality of users, wherein the user activity data comprises information relating to user-engagement indications of the plurality of users,
identify a plurality of connection pairs based on the user activity data, wherein each connection pair comprises a target document and a candidate recommendation document,
determine a connection strength for each of the plurality of connection pairs,
generate an overall grade for each of a set of candidate connection pairs of the plurality of connection pairs, wherein the overall grade is based on the respective connection strength associated with each of the set of candidate connection pairs, and wherein the overall grade is decreased in view of a causality component representing a high global user-engagement indication value for a respective candidate recommendation document, and
identify, by the processing device, one or more filtered recommendations for the target document based on a comparison of the overall grade associated with the candidate connection pairs.

9. The system of claim 8, the processing device further configured to facilitate provisioning of at least one of the one or more identified filtered recommendations associated with the target document.

10. The system of claim 8, wherein the overall grade is based at least in part on a common user component, an aging component, and the causality component.

11. The system of claim 10, wherein the common user component represents a measure of unique user-engagement indications associated with a respective connection pair.

12. The system of claim 10, wherein the aging component represents at least one of a measure of an age of a respective candidate recommendation document or an age of a respective connection pair of the plurality of connection pairs.

13. A non-transitory computer readable storage medium comprising instructions thereon that, in response to execution by a processing device, cause the processing device to perform operations comprising:
collecting user activity data associated with a plurality of users, wherein the user activity data comprises information relating to user-engagement indications of the plurality of users;
identifying a plurality of connection pairs based on the user activity data, wherein each connection pair comprises a target document and a candidate recommendation document;
determining a connection strength for each of the identified connection pairs;
generating an overall grade for each of a set of candidate connection pairs of the plurality of connection pairs, wherein the overall grade is based on the respective connection strength associated with each of the set of candidate connection pairs, and wherein the overall grade is decreased in view of a causality component representing a high global user-engagement indication value for a respective candidate recommendation document; and
identifying, by the processing device, one or more filtered recommendations for the target document based on a comparison of the overall grade associated with the candidate connection pairs.

14. The non-transitory computer readable storage medium of claim 13, the operations further comprising facilitating provisioning of at least one of the one or more identified filtered recommendations associated with the target document.

15. The non-transitory computer readable storage medium of claim 13, wherein the overall grade is based at least in part on a common user component, an aging component, and the causality component.

16. The non-transitory computer readable storage medium of claim 15, wherein the common user component represents a measure of unique user-engagement indications associated with a respective connection pair.

17. The non-transitory computer readable storage medium of claim 16, wherein the aging component represents at least one of a measure of an age of a respective candidate recommendation document or a measure of an age of a respective connection pair of the plurality of connection pairs.

* * * * *